(12) United States Patent
Varadarajan et al.

(10) Patent No.: US 10,740,617 B2
(45) Date of Patent: Aug. 11, 2020

(54) PROTECTION AND RECOVERY OF IDENTITIES IN SURVEILLANCE CAMERA ENVIRONMENTS

(71) Applicant: Intel Corporation, Santa Clara, CA (US)

(72) Inventors: Srenivas Varadarajan, Bangalore (IN); Omesh Tickoo, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 99 days.

(21) Appl. No.: 15/846,466

(22) Filed: Dec. 19, 2017

(65) Prior Publication Data

US 2019/0042851 A1 Feb. 7, 2019

(51) Int. Cl.
*G06K 9/00* (2006.01)
*H04N 7/18* (2006.01)

(52) U.S. Cl.
CPC ...... *G06K 9/00711* (2013.01); *G06K 9/00288* (2013.01); *G06K 9/00302* (2013.01); *G06K 9/00335* (2013.01); *G06K 9/00362* (2013.01); *G06K 9/00771* (2013.01); *H04N 7/183* (2013.01); *G06K 2009/00738* (2013.01)

(58) Field of Classification Search
None
See application file for complete search history.

(56) References Cited

U.S. PATENT DOCUMENTS

| 2003/0231769 | A1* | 12/2003 | Bolle | G06T 1/0021 380/210 |
| 2016/0379047 | A1* | 12/2016 | Natan | G06K 9/00281 382/201 |
| 2018/0249125 | A1* | 8/2018 | Mate | H04N 7/18 |

OTHER PUBLICATIONS

Carrillo et al., "Compression Independent Reversible Encryption for Privacy in Video Surveillance," EURASIP Journal on Information Security, vol. 2009, Article ID 429581, 13 pages (Year: 2009).*
Senior et al., "Enabling Video Privacy through Computer Vision," IEEE Security and Privacy Magazine 3(3), 50-57 (2005) (Year: 2005).*

* cited by examiner

*Primary Examiner* — Soo Shin
(74) *Attorney, Agent, or Firm* — Jaffery Watson Mendonsa & Hamilton LLP

(57) ABSTRACT

A mechanism is described for facilitating protection and recovery of identities in surveillance camera environments according to one embodiment. An apparatus of embodiments, as described herein, includes detection and reception logic to receive a video stream of a scene as captured by a camera, wherein the scene includes persons. The apparatus may further include recognition and application logic to recognize an abnormal activity and one or more persons associated with the abnormal activity in a video frame of the video stream. The apparatus may further include identity recovery logic to recover one or more identities of the one or more persons in response to the abnormal activity, where the one or more identities are recovered from masked data and encrypted residuals associated with the one or more persons.

17 Claims, 8 Drawing Sheets

PROTECTION AND RECOVERY OF IDENTITIES IN SURVEILLANCE CAMERA ENVIRONMENTS

FIELD

Embodiments described herein relate generally to data processing and more particularly to facilitate protection and recovery of identities in surveillance camera environments.

BACKGROUND

Closed-Circuit Television (CCTV) cameras are often seen as deployed in public and private places for surveillance purposes. However, conventional techniques for employing and using CCTV cameras are regarded as intrusive for exposing identities of people in captured scenes, which can often lead to breach of privacy. Even the privacy protection algorithms available today are incapable of offering seamless security as they are easily hacked, such as during streaming of data.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
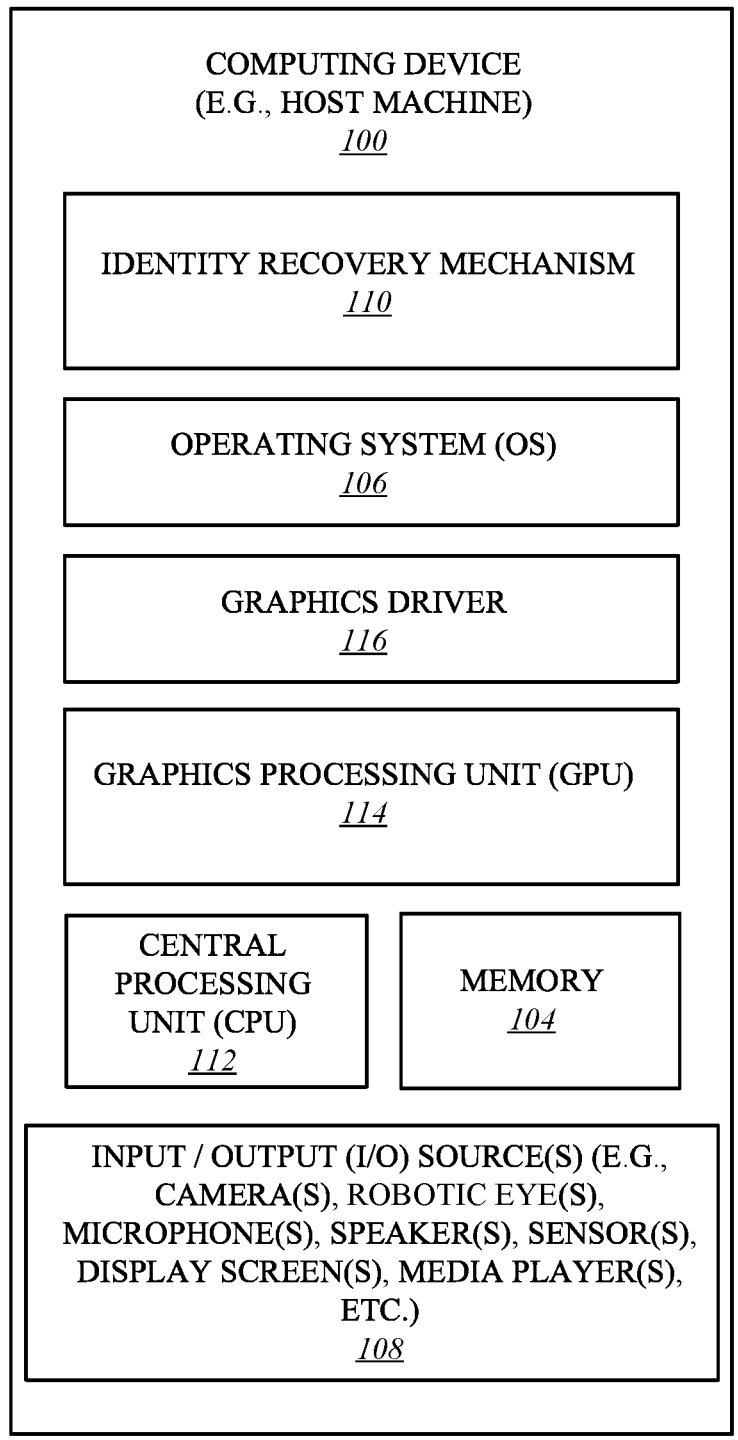
FIG. 1 illustrates a computing device employing an identity recovery mechanism according to one embodiment.

In the following description, numerous specific details are set forth. However, embodiments, as described herein, may be practiced without these specific details. In other instances, well-known circuits, structures and techniques have not been shown in detail in order not to obscure the understanding of this description.

Embodiments provide for a novel technique for using human pose-estimation to secure the identities of individuals within the scope of CCTV cameras (also referred to as "surveillance cameras" or simply "cameras") such that even if an individual is captured in a scene by one or more cameras, their privacy would be guaranteed.

Further, in one embodiment, in case of an event requiring the identity of an individual or for deciphering a scene (such as in case of a crime being committed by one or more individuals in the scene), the secured identities of the relevant individuals may be easily recovered.

It is contemplated that terms like "request", "query", "job", "work", "work item", and "workload" may be referenced interchangeably throughout this document. Similarly, an "application" or "agent" may refer to or include a computer program, a software application, a game, a workstation application, etc., offered through an application programming interface (API), such as a free rendering API, such as Open Graphics Library (OpenGL®), DirectX® 11, DirectX® 12, etc., where "dispatch" may be interchangeably referred to as "work unit" or "draw" and similarly, "application" may be interchangeably referred to as "workflow" or simply "agent". For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

It is to be noted that terms or acronyms like convolutional neural network (CNN), CNN, neural network (NN), NN, deep neural network (DNN), DNN, recurrent neural network (RNN), RNN, and/or the like, may be interchangeably referenced throughout this document. Further, terms like "autonomous machine" or simply "machine", "autonomous vehicle" or simply "vehicle", "autonomous agent" or simply "agent", "autonomous device" or "computing device", "robot", and/or the like, may be interchangeably referenced throughout this document.

FIG. 1 illustrates a computing device 100 employing an identity recovery mechanism ("recovery mechanism") 110 according to one embodiment. Computing device 100 represents a communication and data processing device including or representing any number and type of smart devices, such as (without limitation) smart command devices or intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet-based cable television set-top boxes, etc.), global positioning system (GPS)-based devices, etc.

In some embodiments, computing device 100 may include (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 100 may include a computer platform hosting an integrated circuit ("IC"), such as a system on a chip ("SoC" or "SOC"), integrating various hardware and/or software components of computing device 100 on a single chip.

As illustrated, in one embodiment, computing device 100 may include any number and type of hardware and/or software components, such as (without limitation) graphics processing unit ("GPU" or simply "graphics processor") 114, graphics driver (also referred to as "GPU driver", "graphics driver logic", "driver logic", user-mode driver (UMD), UMD, user-mode driver framework (UMDF), UMDF, or simply "driver") 116, central processing unit ("CPU" or simply "application processor") 112, memory 104, network devices, drivers, or the like, as well as input/output (I/O) sources 108, such as touchscreens, touch panels, touch pads, virtual or regular keyboards, virtual or regular mice, ports, connectors, etc. Computing device 100 may include operating system (OS) 106 serving as an interface between hardware and/or physical resources of computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

In one embodiment, as illustrated, recovery mechanism 110 may be hosted by operating system 106 in communication with I/O source(s) 108 of computing device 100. In another embodiment, recovery mechanism 110 may be hosted or facilitated by graphics driver 116. In yet another embodiment, recovery mechanism 110 may be hosted by or part of graphics processing unit ("GPU" or simply graphics processor") 114 or firmware of graphics processor 114. For example, recovery mechanism 110 may be embedded in or implemented as part of the processing hardware of graphics processor 114. Similarly, in yet another embodiment, recovery mechanism 110 may be hosted by or part of central processing unit ("CPU" or simply "application processor") 112. For example, recovery mechanism 110 may be embedded in or implemented as part of the processing hardware of application processor 112.

In yet another embodiment, recovery mechanism 110 may be hosted by or part of any number and type of components of computing device 100, such as a portion of recovery mechanism 110 may be hosted by or part of operating system 116, another portion may be hosted by or part of graphics processor 114, another portion may be hosted by or part of application processor 112, while one or more portions of recovery mechanism 110 may be hosted by or part of operating system 116 and/or any number and type of devices of computing device 100. It is contemplated that embodiments are not limited to any implementation or hosting of recovery mechanism 110 and that one or more portions or components of recovery mechanism 110 may be employed or implemented as hardware, software, or any combination thereof, such as firmware.

Computing device 100 may host network interface(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), $4^{th}$ Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 2:
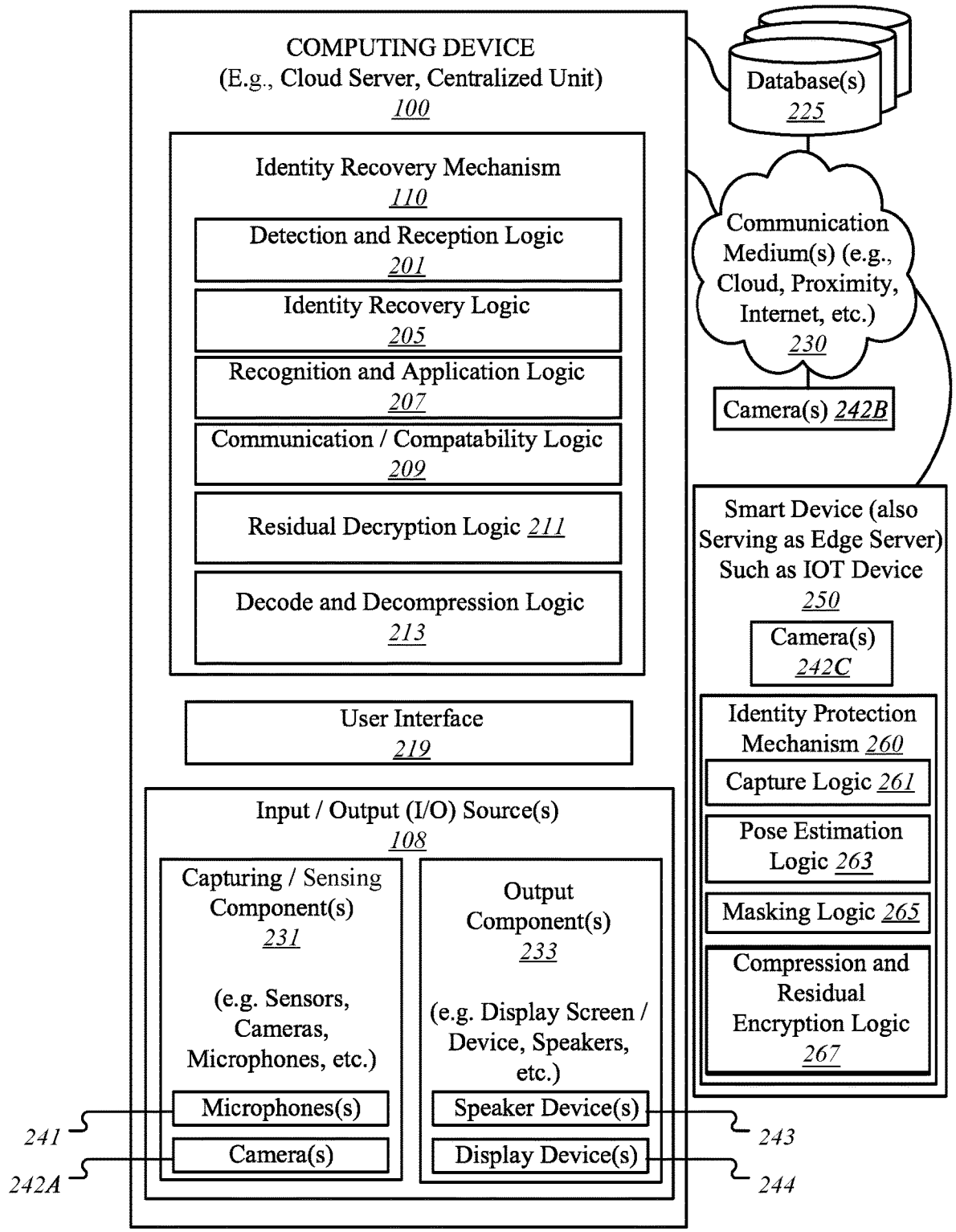
FIG. 2 illustrates the identity recovery mechanism of FIG. 1 and an identity protection mechanism according to one embodiment.

FIG. 2 illustrates the identity recovery mechanism 110 of FIG. 1 and an identity protection mechanism 260 according to one embodiment. For brevity, many of the details already discussed with reference to FIG. 1 are not repeated or discussed hereafter. In one embodiment, recovery mechanism 110 may include any number and type of components, such as (without limitations): detection and reception logic 201; identity recovery logic 205; recognition and application logic 207; communication/compatibility logic 209; residual decryption logic 211; and decode and decompression logic 213.

As illustrated, in one embodiment, computing device 100, serving as a cloud-based server (and referred to as "cloud server" throughout this document), may be in communication with other cameras over communication medium(s) 230 (e.g., cloud network, proximity network, Internet, etc.), such as camera(s) 242B, camera(s) 242C, etc. As illustrated, camera(s) 242C is hosted by computing device 250, where computing device 250 (e.g., smart device, IoT device, etc.) serves as an edge server (and is referred to as "edge server" throughout this document).

As with recovery mechanism 110, edge server 250 may host identity protection mechanism ("protection mechanism") 260, where protection mechanism 260 may be hosted by or part of any number and type of components of edge server 250, such as a portion of protection mechanism 260 may be hosted by or part of its operating system, another portion may be hosted by or part of its graphics processor, another portion may be hosted by or part of an application processor, while one or more portions of protection mechanism 260 may be hosted by or part of the operating system and/or any number and type of devices of edge server 250. It is contemplated that embodiments are not limited to any implementation or hosting of protection mechanism 260 and that one or more portions or components of protection mechanism 260 may be employed or implemented as hardware, software, or any combination thereof, such as firmware.

Cloud server 100 is further shown to include user interface 219 (e.g., graphical user interface (GUI)-based user interface, Web browser, cloud-based platform user interface, software application-based user interface, other user or application programming interfaces (APIs), etc.). Similarly, edge server 250 may also include one or more user interfaces. Cloud server 100 may further include I/O source(s) 108 having capturing/sensing component(s) 231, such as camera(s) 242A (e.g., surveillance cameras, CCTV cameras, search cameras, Intel® RealSense™ cameras), sensors, microphone(s) 241, etc., and output component(s) 233, such as display device(s) or simply display(s) 244 (e.g., integral displays, tensor displays, projection screens, display screens, etc.), speaker devices(s) or simply speaker(s) 243, etc. Similarly, edge server 250 may include I/O sources including all forms and type of input devices (e.g., camera(s) 242C, sensors, microphones, etc.) and output devices (e.g., speaker devices, display devices, etc.)

Cloud server 100 is further illustrated as having access to and/or being in communication with one or more database(s) 225 and/or one or more of other computing devices over one or more communication medium(s) 230 (e.g., networks such as a cloud network, a proximity network, the Internet, etc.).

In some embodiments, database(s) 225 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or preferred details, and/or the like.

As aforementioned, cloud server 100 may host I/O sources 108 including capturing/sensing component(s) 231 and output component(s) 233. In one embodiment, capturing/sensing component(s) 231 may include a sensor array including, but not limited to, microphone(s) 241 (e.g., ultrasound microphones), camera(s) 242A, 242B, 242C (e.g., two-dimensional (2D) cameras, three-dimensional (3D) cameras, infrared (IR) cameras, depth-sensing cameras, surveillance cameras, etc.), capacitors, radio components, radar components, scanners, and/or accelerometers, etc. Similarly, output component(s) 233 may include any number and type of speaker(s) 243, display device(s) 244 (e.g., screens, projectors, light-emitting diodes (LEDs)), and/or vibration motors, etc.

For example, as illustrated, capturing/sensing component(s) 231 may include any number and type of microphones(s) 241, such as multiple microphones or a microphone array, such as ultrasound microphones, dynamic microphones, fiber optic microphones, laser microphones, etc. It is contemplated that one or more of microphone(s) 241 serve as one or more input devices for accepting or receiving audio inputs (such as human voice) into cloud server 100 and converting this audio or sound into electrical signals. Similarly, it is contemplated that one or more of camera(s) 242A, 242B, 242C serve as one or more input devices for detecting and capturing of image and/or videos of scenes, objects, etc., and provide the captured data as video inputs into cloud server 100.

It is contemplated that embodiments are not limited to any number or type of microphone(s) 241, camera(s) 242A, 242B, 242C, speaker(s) 243, display(s) 244, etc. For example, as facilitated by detection and capture logic 201, camera(s) 242A, 242B, 242C may be used to capture images or videos of geographic locations (e.g., streets, parks, train stations, airports, homes, office buildings, zoo, theaters, halls, hotels, sports arenas, casinos, hospitals, shops, malls, etc.) and their contents (e.g., humans, animals, plants, vehicles, furniture, equipment, empty space, etc.) and form a set of images or a video stream using the captured data for further processing by recovery mechanism 110 at cloud server 100. Similarly, as illustrated, output component(s) 233 may include any number and type of speaker(s) 243 to serve as output devices for outputting or giving out audio from cloud server 100, where speaker(s) 243 work the opposite of microphone(s) 241 as speaker(s) 243 are used to convert electric signals into sound.

Embodiments provide for a novel technique, as facilitated by one or more of protection mechanism 260 and recovery mechanism 110, for detecting, protecting, and recovering identities of individuals in public and/or private geographic locations using human pose-estimations. For example, recovering of an identity may involve unmaking of the identity using a secured path as facilitated by recovery mechanism 110.

As illustrated, camera(s) 242A, 242B, 242C may be used as CCTV or surveillance cameras for surveillance of places and people, both in public and private, where the captured video streams or images may be stored at database(s) 225 for further analysis. For example, in case of an Internet of Things (IoT) framework, the captured video streams from edge sensor 250, such as camera(s) 242C, of an IoT device may be streamed back to a server computer or a centralized device, such as cloud server 100, over one or more communication medium(s) 230 (e.g., cloud network, Internet, etc.).

Although any data captured through camera(s) 242A, 242B, 242C, as facilitated by capture logic 261 in case of camera(s) 242C, may include and thus offer a rich set of visual features for information extraction, it is the protecting of identities of those captured in the video streams as offered through protection mechanism 260 and then recovering of one or more of those protected identities, when necessitated, is provided through recovery mechanism 110. This way there is no breach of privacy of individuals, willingly or unwillingly, captured in video streams, while, in case of certain events (such as crimes, accidents, natural disasters, etc.), any of the relevant protected identities may be recovered seamlessly and in real-time.

In one embodiment, videos captured through camera(s) 242 may be processed for protection using one or more components of protection mechanism 260 at edge server 250 and recovery using one or more components of recovery mechanism 100 at cloud server 110. In another embodiment, such as in case of camera(s) 242B, all protection and recovery processes may be performed by cloud server 100 hosting both the components of protection mechanism 260 and recovery mechanism 110. Similarly, in yet another embodiment, camera(s) 242B may outsource any identity protection processes for its captured video to protection mechanism 260 of edge server 250, while communicate directly or through edge server 250 to have recovery mechanism 110 of cloud server 100 perform any identity recovery processes for its video.

Further, in one embodiment, this novel protection and recovery technique is secured from hacking and other such malicious intrusions during and after capturing and/or streaming of videos, where such hacking and intrusion events are common with conventional techniques.

Embodiments provide for a novel approach for face-detection, face-tracking, and obfuscation for identity protection through protection mechanism 260 and/or recovery mechanism 110. For example, in some embodiments, a person's skin regions may be used for privacy protection. Similarly, identifications may be inferred from a person's face or even dressing accessories, such as a necklace, a watch, a ring, a brand of clothing, etc., as illustrated with reference to FIG. 3A. In one embodiment, this novel protection and recovery technique further provides for scrambling image regions of predefined objects, persons, vehicles, etc., under consideration, such as once any regions of interest (ROIs) are extracted.

Figure 3A:
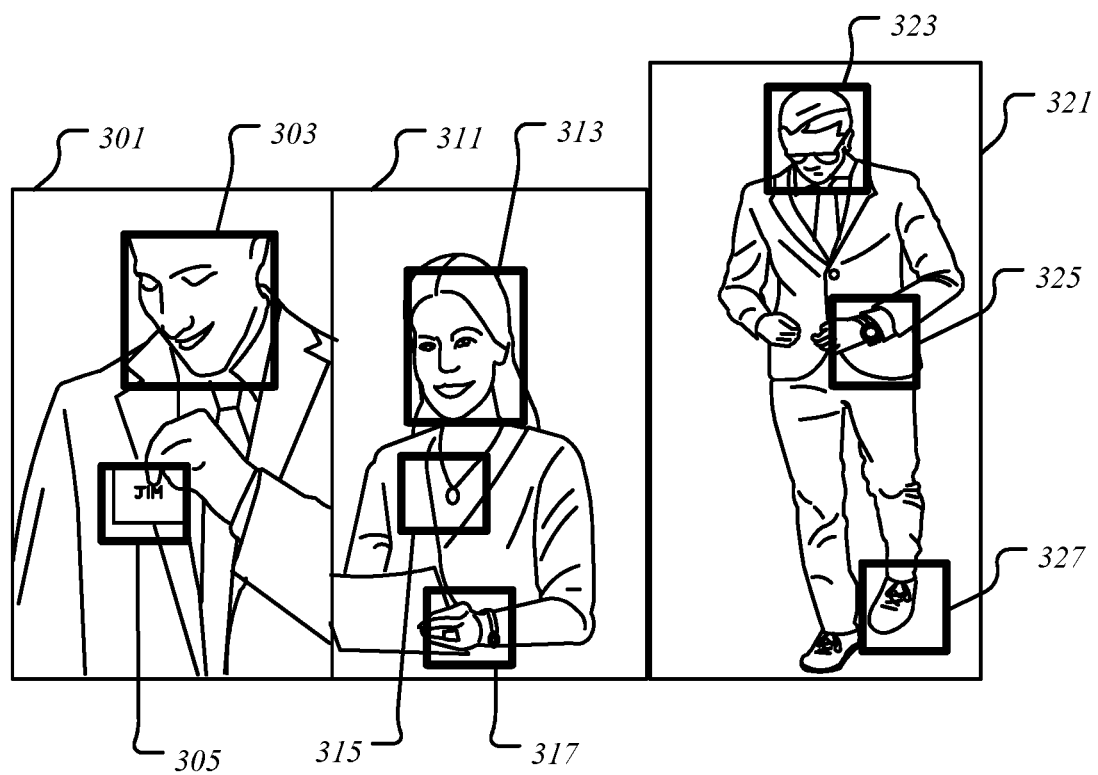
FIG. 3A illustrates multiple views of humans in scenes according to one embodiment.

Embodiments provide for a novel protection and recovery technique that is not too-specific to occlude specific body parts, such as face, or too-general covering the entire body of a person. For example, as illustrated in FIG. 3A, identities of persons 301, 311, 321 may be revealed not merely through their faces 303, 313, 323, respectively, but also through personal objects attached to or associated with the persons' bodies, such as employee identification (ID) 305, necklace 315, ring 317, watch 325, and shoe 327, and/or the like, that are worn one or at specific portions or regions of a human body. Since human pose can selectively occlude body parts, such as faces 303, 313, 323 may be occluded by other persons, objects, etc., using other objects, such as objects 305, 315, 317, 325, 327, etc., for identification purposes may allow for striking a balance between protection of privacy and loss of information. This is also taking into consideration encryption and/or scrambling approaches that may lead to a drift-error while performing predictive video decoding or a higher video transmission bandwidth.

Further, as illustrated with reference to FIG. 3B, detection and capture of a scene including humans and objects associated with humans, using one or more camera(s) 242A, 242B, 242C being facilitated by their local capture engines, such as detection and reception logic 201 in case of camera(s) 242A, capture logic 261 in case of camera(s) 242C, etc., may lead to preparation of data including images and/or video streams of the scene as captured. This data may then be communicated on to pose estimation logic 263 for further processing, such as performing pose estimation at the front end of the media pipe towards simultaneous goals of privacy protection, as facilitated by pose estimation logic 203, and action recognition as facilitated by recognition and application logic 207.

In one embodiment, as facilitated by pose estimation logic 263, human pose estimated to allow for localization of any regions of the scene containing human body parts, which further allows for localization of primary sources of identity (such as a human face) and any secondary sources of identity (such as watches, ID cards, rings, etc.) captured and identified in one or more video frames of a video stream of a scene.

As illustrated with reference to FIG. 3B, frame 341 represents the original video frame from a video stream as captured by one or more camera(s) 242A, 242B, 242C, where frames 343, 345, 347 represent three types of identity protections based on two-dimensional (2D) pose localization based on pose estimation as facilitated by pose estimation logic 263. For example, frames 343, 345, 347 show human limbs of the person captured in frame 341. As shown in frames 343, 345, 347 of FIG. 3B, human pose may be one of the single largest contributors for reliable recognition of actions involving major limb movements, where the usage of the estimated pose for privacy protection, as facilitated by pose estimation logic 203, in an action recognition framework may be achieved without consuming any additional resources of or putting any undue burden on the system, such as edge server 250, cloud server 100.

Further, in one embodiment, pose estimation logic 263 may then communicate the pose estimation and any other pertinent with masking logic 265 for initiating protection of the privacy of any individual in the scene at the time of capture of the scene by one or more cameras, such as camera(s) 242C, to prevent and avoid any potential hacking, intrusion, and other such malicious or unintentional attacks by anyone of the video stream.

In one embodiment, privacy of any individuals in the scene may be protected by masking of the individuals as facilitated by masking logic 265, such as by masking the relevant portions (e.g., faces and other identifying objects, such as watches, ID cards, rings, etc.) of such individuals. Similarly, if needed, these masked images may be securely communicated between any number and type of processing devices, such as edge server 250, cloud server 100, etc., and other cameras or devices, such as camera(s) 240B, etc., over communication medium(s) 230 (e.g., cloud network, Internet) as facilitated by local communication engines, such as communication/compatibility logic 209.

This masking of individuals into masked images as facilitated by masking logic 265 along with secured communication of such masked images allows for a greater network of and communication between cameras 242A, 242B, 242C and eliminates any danger of compromising privacy of any of the individuals captured in video streams. Further, in one embodiment, any residuals from the video stream are then compressed and encrypted using compression and residual encryption logic 267. These residuals refer to or include any other portions or parts of the scene that may not be entirely masked. For example, of an individual's face and chest area (for wearing an ID card) are masked, then the rest of the body of that individual may be regarded as residual, which is then encrypted for protection using compression and residual encryption logic 267. Although these residuals may not be masked, they are, however, encrypted and preserved for future use in helping with identifying of individuals when their images are unmasked and identities recovered.

Embodiments further provide for a secured and full recovery of identities of individuals from masked images, when necessitated, as facilitated by identity recovery logic 205 and recognition and application logic 207. For example, in one embodiment, recognition and application logic 207 may recognize any abnormal actions or activities in a video stream which may lead to its communication with identity recovery logic 205 to unmask the relevant individuals so that any subsequent processes may be performed.

For example, detection or recognition of abnormal activities may range from detection/recognition of crimes (e.g., theft, robbery, murder, pick pocking, terrorism, etc.) to fight/brawls (e.g., two or more individuals fighting or brawling) to accidents (e.g., road accidents, construction accidents, etc.) to natural disasters (e.g., earthquakes, floods, hurricanes, etc.), and/or the like, as facilitated by recognition and application logic 207. Upon detection of an abnormal activity, it may become essential to unmask the identities of certain individuals, such as criminals, victims, etc., so that their identities may be recovered as facilitated by recovery logic 205. This information may then be used for subsequent processes, such as communicating the information to law-enforcement authorities, hospitals, families, etc., as facilitated by communication/compatibility logic 209.

In some embodiments, when an abnormal activity is recognized by recognition and application logic 207, any encrypted residuals associated with any unmasked individuals and/or other portions of the scene are then decrypted using residual decryption logic 211 and added to the masked frame to fully and securely recover the relevant identities as facilitated by identity recovery logic 205.

As further illustrated and described with reference to FIG. 4A, for example, using camera(s) 242C of edge server 250, such as an IoT device, as a surveillance camera, several sub-systems, components, and/or processes may be triggered to achieve protection of identity, action detection, and recovery of identity, where such sub-systems, components, and/or processes may include: 1) IoT-based camera(s) 242C for surveillance; 2) edge server-based processes including compression of data at 405, human pose estimation at 401, transmission of pose data at 411, and masking of red green blue (RGB) frames at 403 from surveillance camera(s) 242C to work with cloud server, such as cloud server 100, for performing visual analytics, where many of the edge server-based processes may be performed locally by edge server 250 or remotely by cloud server 100; 3) protected server-based processes including hosting encrypted residual data at one or more database(s) for short duration and transmitting this data to cloud server, such as cloud server 100, if any abnormality is discovered in one or more frames of a video stream; and 4) server computer-based processes to perform computer vision tasks like object and human pose based abnormal action recognition at 409, where such actions are modelled as sequence of poses and recognized through one or more techniques, such as Hidden Markov Models (HMMs).

Figure 4A:
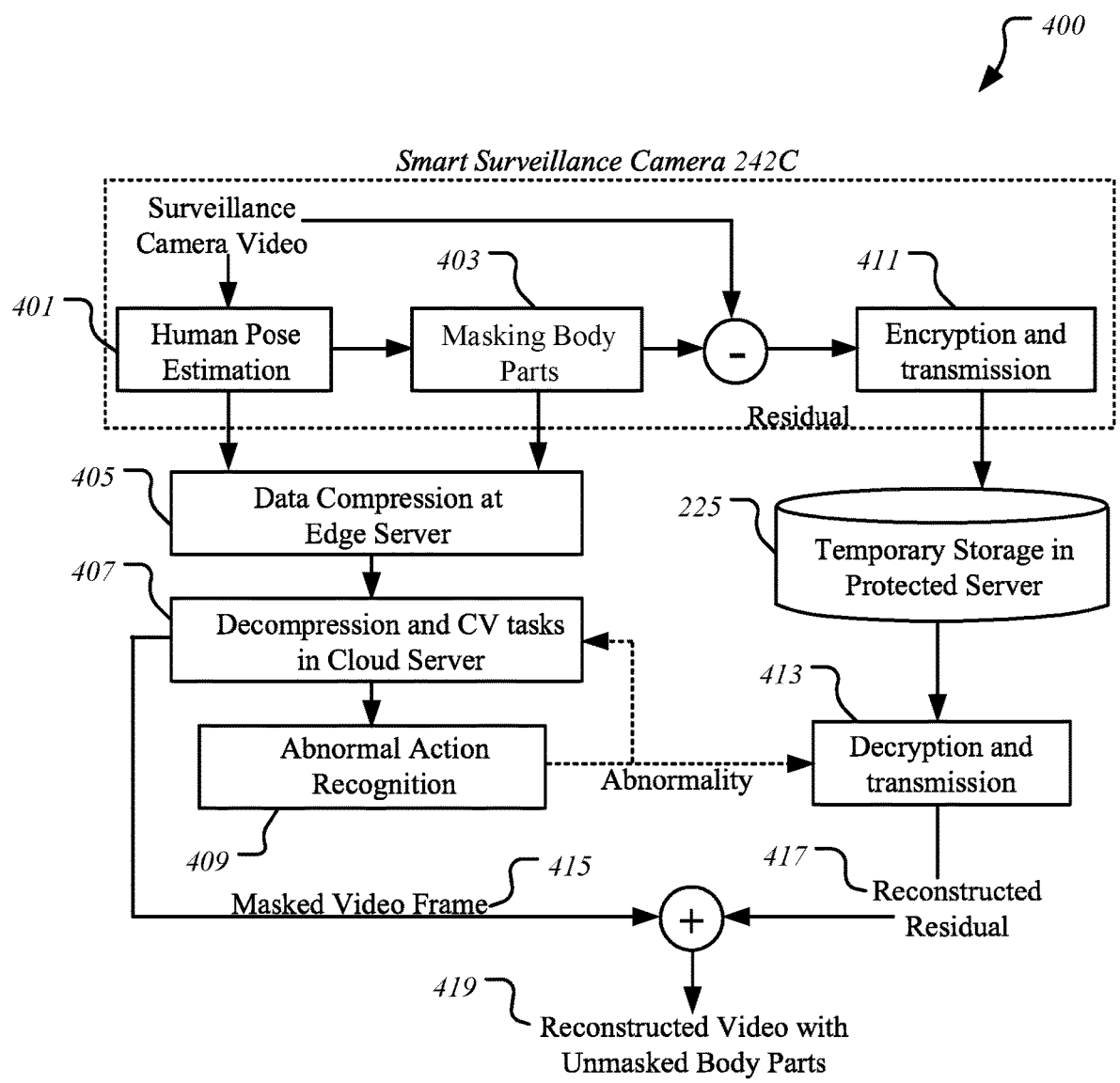
FIG. 4A illustrates an architectural setup offering a transaction sequence for protection and recovery of individual identities according to one embodiment.

For example, as illustrated with respect to FIG. 4A, upon receiving a video steam of a scene as captured by smart surveillance camera 242C of edge server 250 as facilitated by capture logic 261, human pose estimation of the video stream is performed by pose estimation logic 263. In one embodiment, using this human pose estimation at 401 of humans as facilitated by pose estimation logic 263, certain body parts of those humans are masked at 403 as facilitated by masking logic 265. For example, as described above, certain body parts, such as human faces and other identifying objects like ID cards, watches, necklaces, etc., may be masked so that identities of the relevant persons may be protected and in turn, their privacy is preserved.

In one embodiment, pose estimation at 401 and masking of body parts at 403 then lead to compression of that data at 405 and then decompression of the compressed data at 407 as facilitated by compression and residual encryption logic 267 and decode and decompression logic 213, respectively. In one embodiment, masked body parts of 403 and any residuals, such as any other not-so-relevant body parts of humans, other irrelevant objects in the scene or on the humans, etc., may then be encrypted as facilitated by residual decryption logic 211 and transmitted at 411 to be stored and maintained at a storage facility, such as database(s) 225.

Now, if an abnormal action (e.g., crime, accident, natural disaster, etc.) is detected and recognized at 409 by recognition and application logic 207, then a corresponding abnormality flag is signaled to the protected server by recognition and application logic 207 for transmitting of encrypted residual data at 411 from database(s) 225. Stated differently, once an abnormal action is detected and recognized, any compressed masked body parts based on human pose estimation are then triggered to be decompressed at 407 into a masked video frame by decode and decompression logic 213 and similarly, any encrypted residual data at database(s) 225 is then triggered to be decrypted and transmitted as reconstructed residuals by residual decryption logic 211.

In one embodiment, using the two sets of data, such as masked video frame 415 and reconstructed residual data 417, identity recovery logic 205 is then triggered to reconstruct the original video at 419 with unmasked body parts of the humans such that the identities of any relevant humans are recovered in response to an abnormal activity despite being completely secured and protected until now for the sake of privacy.

It is contemplated that using recovery mechanism 110 and protection mechanism 260, various resources of cloud server 100 and other relevant devices, such as edge server 250, database(s) 225, etc., may be used for using and deploying of resources for visual data storage and processing, where most of the visual data is expected to contain humans whose privacy needs be protected. In one embodiment, human pose-based privacy protection may be facilitated through recovery mechanism 110 and protection mechanism 260, where one or more portions of which may be embedded in specialized hardware for storage and processing to add additional value.

Embodiments as facilitated by protection mechanism 260 and/or recovery mechanism 110 may be used with smart devices, such as edge server 250 (e.g., IoT device), in certain artificial intelligent frameworks, such as IoT frameworks, that can involve data transmission from one device to another, such as from edge serve3r 250 to cloud server 100 serving as a server computer, over communication medium(s) 230 (e.g., cloud network). In these cases, any transmission of data (e.g., communication of video streams) between edge server 250 and cloud server 100, as facilitated by communication/compatibility logic 209, may be secured and protected to ensure full protection of human identities and thus their privacy both during and after transmission.

Further, compared to merely faced-based, skin-based, and/or foreground-based ROI selections, embodiments provide for a human pose-based ROI selection to offer far superior localization over specific body parts of humans. This also brings into play other parts of body through objects (e.g., jewelry, ID cards, clothing, etc.) associated with those parts of body for identification and recovery processes to provide for additional reliability and improvement.

In one embodiment, human pose estimation may be performed at edge servers, such as at local devices like edge server 250, etc., by a local engine, such as pose estimation logic 263, to alleviate any additional workload on shared cloud servers, such as cloud server 100, which may allow for recovery mechanism 110 at cloud server 100 to focus on and be responsible for recognition of abnormal activities, as facilitated by recognition and application logic 207, on video streams captured from various edge cameras, such as camera(s) 242C, recovery of identities as facilitated by identity recovery logic 205. Since smart devices, such as edge server 250, are becoming increasingly sophisticated and intelligent, this technique of having them serve as edge servers to perform certain tasks, such as estimating human pose, may allow for shifting of the burden from cloud, centralized, and/or remote server computers, such as cloud server 100, to local sophisticated and intelligent edge devices, such as smart device 250, powered by artificial intelligence.

Embodiments provide for estimation and utilization of human pose for privacy protection through selective masking of primary identity sources (e.g., human face) and secondary identity sources (e.g., ID cards, jewelry, shoes, clothing, etc.) associated with humans Embodiments further provide for integrated human pose-estimation using surveillance camera(s) 242A, 242B, 242C for simultaneous usages of human privacy protection and human action/activity recognition. Embodiments further provide for the use of smart or autonomous frameworks, such as IoT frameworks, for privacy protection while transmitting data between smart camera(s) 242C associated with edge processors of edge devices, such as edge server 250, other smart cameras, such as camera(s) 242B, and server computers, such as cloud server 100, over one or more communication medium(s) 230, such as a cloud network, for performing visual analytics.

Embodiments further provide for encryption of residual data between the masked and original video frames for privacy protection as facilitated by compression and residual encryption logic 267 and residual decryption logic 211 as opposed to merely encrypting the original content. Embodiments further provide for storing any residual data containing privacy information in a separate protect sever or device, such as database(s) 225. Embodiments further provide for adding a residual frame obtained from a different network path to masked privacy protected images to help restore identities of individuals as facilitated by identity recovery logic 205. Embodiments further provide for avoiding high computational complexities, while preserving encoding efficiency (perceptual quality at a given bit-rate) and preventing any drift errors in motion estimation by decoupling the encryption from a regularly encoded stream as facilitated by residual decryption logic 211 and/or decode and decompression logic 213.

Referring back to FIG. 2, capturing/sensing component(s) 231 may further include any number and type of camera(s) 242A, such as depth-sensing cameras or capturing devices (e.g., Intel® RealSense™ depth-sensing camera) that are known for capturing still and/or video red-green-blue (RGB) and/or RGB-depth (RGB-D) images for media, such as personal media. Such images, having depth information, have been effectively used for various computer vision and computational photography effects, such as (without limitations) scene understanding, refocusing, composition, cinema-graphs, etc. Similarly, for example, displays may include any number and type of displays, such as integral displays, tensor displays, stereoscopic displays, etc., including (but not limited to) embedded or connected display screens, display devices, projectors, etc.

Like cloud server 100, other cameras and computing devices, such as camera(s) 242B, edge server 250, etc., in communication with cloud server 100 may also include capturing and/or sensing components like those of capturing/sensing components 231 and output components 233, described above and henceforth, including any number and type of cameras as well as other capturing components, sensors, detectors, monitoring tools, speaker devices, display devices, etc. Thus, for brevity, individual components of camera(s) 242B and edge server 250 are not illustrated or described here in favor of sufficient discussion with respect to capturing/sensing components 231 and output components 233 of cloud server 100.

Capturing/sensing component(s) 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more capturing/sensing component(s) 231 may further include one or more of supporting or supplemental devices for capturing and/or sensing of data, such as illuminators (e.g., IR illuminator), light fixtures, generators, sound blockers, etc.

It is further contemplated that in one embodiment, capturing/sensing component(s) 231 may further include any number and type of context sensors (e.g., linear accelerometer) for sensing or detecting any number and type of contexts (e.g., estimating horizon, linear acceleration, etc., relating to a mobile computing device, etc.). For example, capturing/sensing component(s) 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); and gravity gradiometers to study and measure variations in gravitation acceleration due to gravity, etc.

Further, for example, capturing/sensing component(s) 231 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.); biometric sensors (such as to detect fingerprints, etc.), calendar maintenance and reading device), etc.; global positioning system (GPS) sensors; resource requestor; and/or TEE logic. TEE logic may be employed separately or be part of resource requestor and/or an I/O subsystem, etc. Capturing/sensing component(s) 231 may further include voice recognition devices, photo recognition devices, facial and other body recognition components, voice-to-text conversion components, etc.

Similarly, output component(s) 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output component(s) 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

It is contemplated that embodiment are not limited to any particular number or type of use-case scenarios, architectural placements, or component setups; however, for the sake of brevity and clarity, illustrations and descriptions are offered and discussed throughout this document for exemplary purposes but that embodiments are not limited as such. Further, throughout this document, "user" may refer to someone having access to one or more computing devices, such as cloud server 100, and may be referenced interchangeably with "person", "individual", "human", "him", "her", "child", "adult", "viewer", "player", "gamer", "developer", programmer", and/or the like.

Communication/compatibility logic 209 may be used to facilitate dynamic communication and compatibility between various components, networks, computing devices (e.g., camera(s) 242B, edge server 250, etc.), database(s) 225, and/or communication medium(s) 230, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, Internet, Internet of Things, intranet, cellular network, proximity networks, such as Bluetooth, Bluetooth low energy (BLE), Bluetooth Smart, Wi-Fi proximity, Radio Frequency Identification, Near Field Communication, Body Area Network, etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", "circuitry", and/or the like, may be referenced interchangeably and include, by way of example, software, hardware, and/or any combination of software and hardware, such as firmware. In one example, "logic" may refer to or include a software component that is capable of working with one or more of an operating system, a graphics driver, etc., of a computing device, such as cloud server 100. In another example, "logic" may refer to or include a hardware component that is capable of being physically installed along with or as part of one or more system hardware elements, such as an application processor, a graphics processor, etc., of a computing device, such as cloud server 100. In yet another embodiment, "logic" may refer to or include a firmware component that is capable of being part of system firmware, such as firmware of an application processor or a graphics processor, etc., of a computing device, such as cloud server 100.

Further, any use of a particular brand, word, term, phrase, name, and/or acronym, such as "scenes", "video streams", "video frames", "images", "human pose", "identification", "primary identity sources", "secondary identity sources", "privacy", "protection", "detection", "recovery", "masking", "unmasking", "abnormal action or activity", "recognition", masked video frame", "residual", "reconstructed residual", "human 2D pose", "RealSense™ camera", "real-time", "automatic", "dynamic", "user interface", "camera", "sensor", "microphone", "display screen", "speaker", "verification", "authentication", "privacy", "user", "user profile", "user preference", "sender", "receiver", "personal device", "smart device", "mobile computer", "wearable device", "IoT device", "proximity network", "cloud network", "server computer", etc., should not be read to limit embodiments to software or devices that carry that label in products or in literature external to this document.

It is contemplated that any number and type of components may be added to and/or removed from recovery mechanism 110 and/or protection mechanism 260 to facilitate various embodiments including adding, removing, and/or enhancing certain features. For brevity, clarity, and ease of understanding of recovery mechanism 110 and/or protection mechanism 260, many of the standard and/or known components, such as those of a computing device, are not shown or discussed here. It is contemplated that embodiments, as described herein, are not limited to any technology, topology, system, architecture, and/or standard and are dynamic enough to adopt and adapt to any future changes.

FIG. 3A illustrates multiple views 301, 311, 313 of humans according to one embodiment and as previously described with reference to FIG. 2. For brevity, many of the details previously discussed with reference to FIGS. 1-2 may not be discussed or repeated hereafter.

The illustrated views 301, 311, 321 provide for primary identity sources, such as human faces 303, 313, 323, respectively, and the relevant secondary identity sources, such as employee ID card 305, necklace 315, ring 317, watch 325, shoe 327. As described with reference to FIG. 2, individuals in scenes 301, 311, 321 may be identified not only using primary identity sources 303, 313, 323, but also secondary identity sources 305, 315, 325, 327, which may both be masked to preserve the individuals' privacy, but then restored or recovered when necessitated upon recognition of an abnormal activity.

Figure 3B:
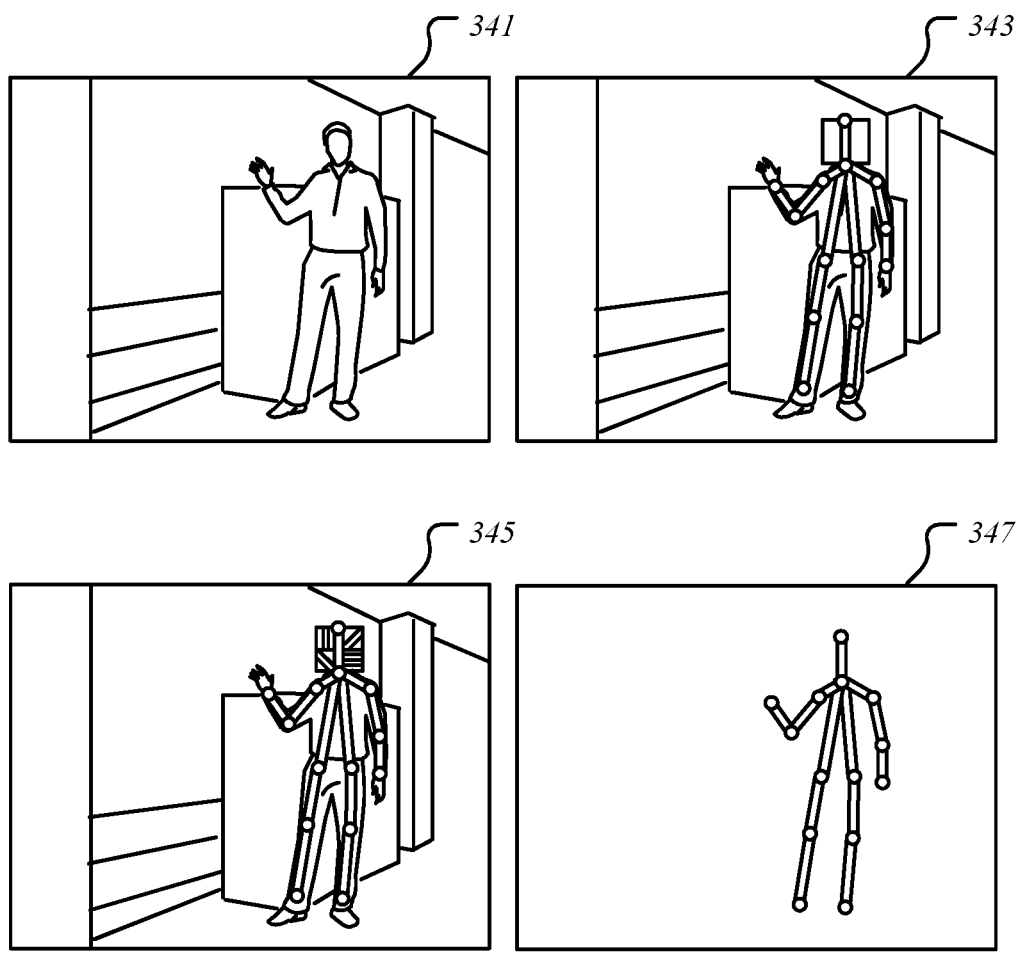
FIG. 3B illustrates original video frame of a person and identity protection frames of the same person according to one embodiment.

FIG. 3B illustrates original video frame 341 of a person and identity protection frames 343, 345, 347 of the same person according to one embodiment and as previously described with reference to FIG. 2. For brevity, many of the details previously discussed with reference to FIGS. 1-3A may not be discussed or repeated hereafter.

As discussed above, in one embodiment, human pose estimation may be performed at the front end of the media pipe towards the simultaneous goals of privacy protection and action detection, followed by recovery or restoration of the protected identification. For example, human pose localizes regions containing relevant human body parts, such as those associated with the primary and secondary identity sources in a video frame. An example of identity protection through face-masking is shown in identity protection frames 343, 345, 347 where the human face and certain other parts of the person's body are occluded when compared to the full display of the person in original video frame 341. It is contemplated that human pose is regarded as the single largest contributor for reliable recognition of abnormal as well as normal actions involving facial expressions, limb movements, etc., for the usage of the human pose for privacy protection in an action recognition framework without any undue burden on any of the devices involved in the process.

FIG. 4A illustrates an architectural setup offering a transaction sequence 400 for protection and reconstruction individual identities according to one embodiment and as previously described with reference to FIG. 2. For brevity, many of the details previously discussed with reference to FIGS. 1-3B may not be discussed or repeated hereafter. Any processes or transactions may be performed by processing logic that may comprise hardware (e.g., circuitry, dedicated logic, programmable logic, etc.), software (such as instructions run on a processing device), or a combination thereof, as facilitated by recovery mechanism 110 and/or protection mechanism 260 of FIG. 2. Any processes or transactions associated with this illustration may be illustrated or recited in linear sequences for brevity and clarity in presentation; however, it is contemplated that any number of them can be performed in parallel, asynchronously, or in different orders.

Figure 4B:
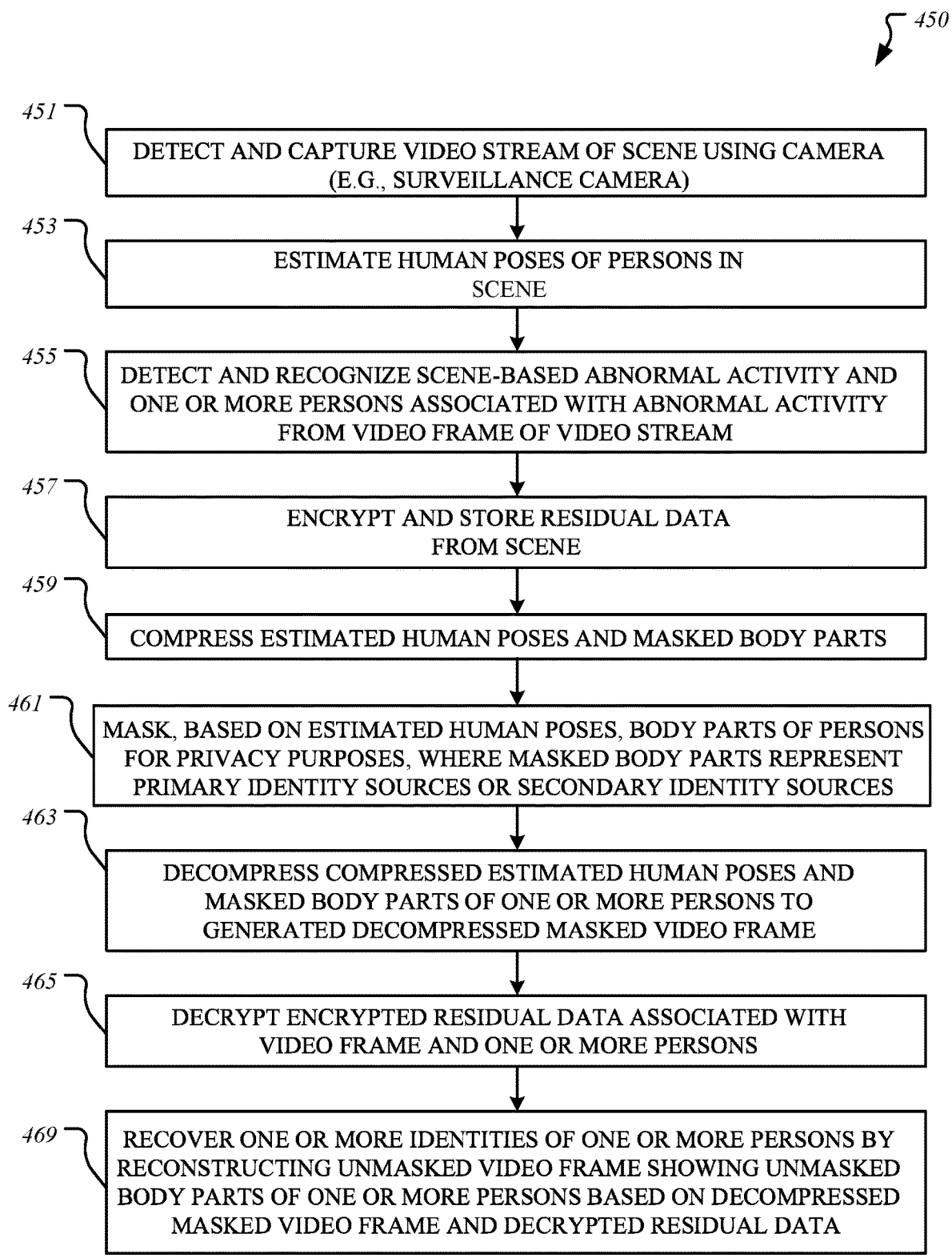
FIG. 4B illustrates a method for protection and recovery of individual identities according to one embodiment.

FIG. 4B illustrates a method 450 for protection and reconstruction of individual identities according to one embodiment. For brevity, many of the details previously discussed with reference to FIGS. 1-4A may not be discussed or repeated hereafter. Any processes or transactions may be performed by processing logic that may comprise hardware (e.g., circuitry, dedicated logic, programmable logic, etc.), software (such as instructions run on a processing device), or a combination thereof, as facilitated by recovery mechanism 110 and protection mechanism of FIG. 2. Any processes or transactions associated with this illustration may be illustrated or recited in linear sequences for brevity and clarity in presentation; however, it is contemplated that any number of them can be performed in parallel, asynchronously, or in different orders.

Method 450 begins at block 451 with detection and capturing of a video stream of a scene having individuals as facilitated by one or more cameras of a computing device (e.g., smart device, such as an IoT device, a wearable device, a surveillance camera, a mobile device, etc.). At block 453, human poses are estimated for the individuals detected in the scene. At block 455, certain body parts of the individuals representing as primary identity sources (e.g., faces) and secondary identity sources (e.g., body parts having identity marks or objects, such as a watch, an ID card, etc.) are masked. At block 457, any residual data from the scene, including other body parts of the individuals, is encrypted and transmitted over to be stored at one or more databases.

In one embodiment, at block 459, human pose estimation and masked body parts are compressed. In some embodiments, these processes of pose estimation and compression may be performed at a local device, such as a smart device, serving as an edge server as opposed to a cloud or centralized server computer in communication with all edge servers/smart devices and isolated cameras.

At block 461, an abnormal action or activity is detected and recognized from the scene, such as from a video frame of the video stream. At block 463, in one embodiment, the compressed human pose estimation and masked body parts in the relevant video frame are then decompressed to produce a decompressed masked video frame such that the masked body parts in the video frame are then unmasked. Similarly, in one embodiment, at block 465, any residual data is obtained from the one or more databases and decrypted so that residual data may be restored in its original form. At block 467, the unmasked body parts and the decrypted residual data are put together to reconstruct the relevant video frame to recover the identifies of one or more individuals involved in or with the abnormal action.

Figure 5:
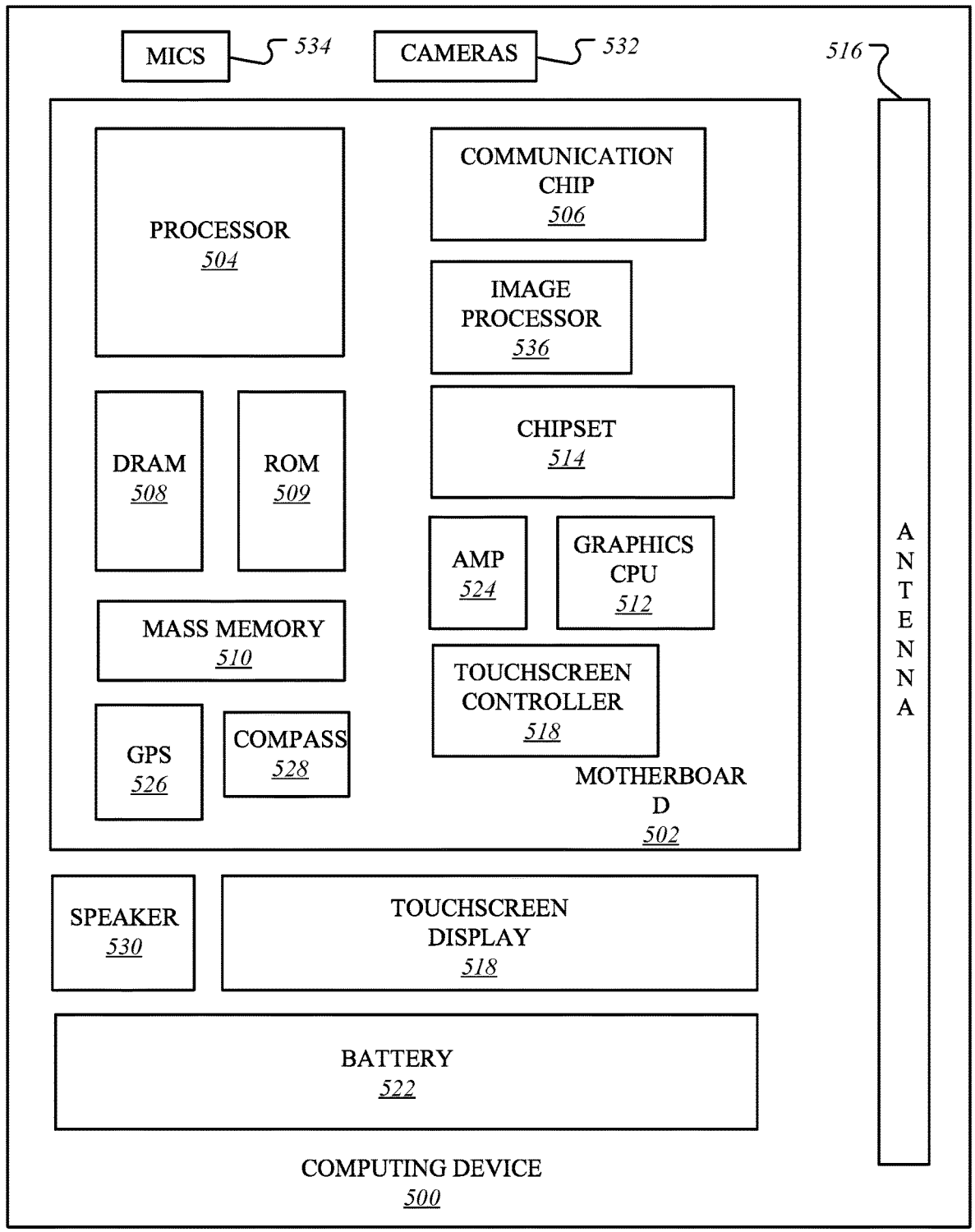
FIG. 5 illustrates a computer device capable of supporting and implementing one or more embodiments according to one embodiment.

FIG. 5 illustrates a computing device 500 in accordance with one implementation. The illustrated computing device 500 may be same as or similar to computing devices 100, 250 of FIG. 2. The computing device 500 houses a system board 502. The board 502 may include a number of components, including but not limited to a processor 504 and at least one communication package 506. The communication package is coupled to one or more antennas 516. The processor 504 is physically and electrically coupled to the board 502.

Depending on its applications, computing device 500 may include other components that may or may not be physically and electrically coupled to the board 502. These other components include, but are not limited to, volatile memory (e.g., DRAM) 508, non-volatile memory (e.g., ROM) 509, flash memory (not shown), a graphics processor 512, a digital signal processor (not shown), a crypto processor (not shown), a chipset 514, an antenna 516, a display 518 such as a touchscreen display, a touchscreen controller 520, a battery 522, an audio codec (not shown), a video codec (not shown), a power amplifier 524, a global positioning system (GPS) device 526, a compass 528, an accelerometer (not shown), a gyroscope (not shown), a speaker 530, cameras 532, a microphone array 534, and a mass storage device (such as hard disk drive) 510, compact disk (CD) (not shown), digital versatile disk (DVD) (not shown), and so forth). These components may be connected to the system board 502, mounted to the system board, or combined with any of the other components.

The communication package 506 enables wireless and/or wired communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 506 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 500 may include a plurality of communication packages 506. For instance, a first communication package 506 may be dedicated to shorter range wireless communications such as Wi-Fi and Bluetooth and a second communication package 506 may be dedicated to longer range wireless communications such as GPS, EDGE, GPRS, CDMA, WiMAX, LTE, Ev-DO, and others.

The cameras 532 including any depth sensors or proximity sensor are coupled to an optional image processor 536 to perform conversions, analysis, noise reduction, comparisons, depth or distance analysis, image understanding, and other processes as described herein. The processor 504 is coupled to the image processor to drive the process with interrupts, set parameters, and control operations of image processor and the cameras. Image processing may instead be performed in the processor 504, the graphics CPU 512, the cameras 532, or in any other device.

In various implementations, the computing device 500 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 500 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Figure 6:
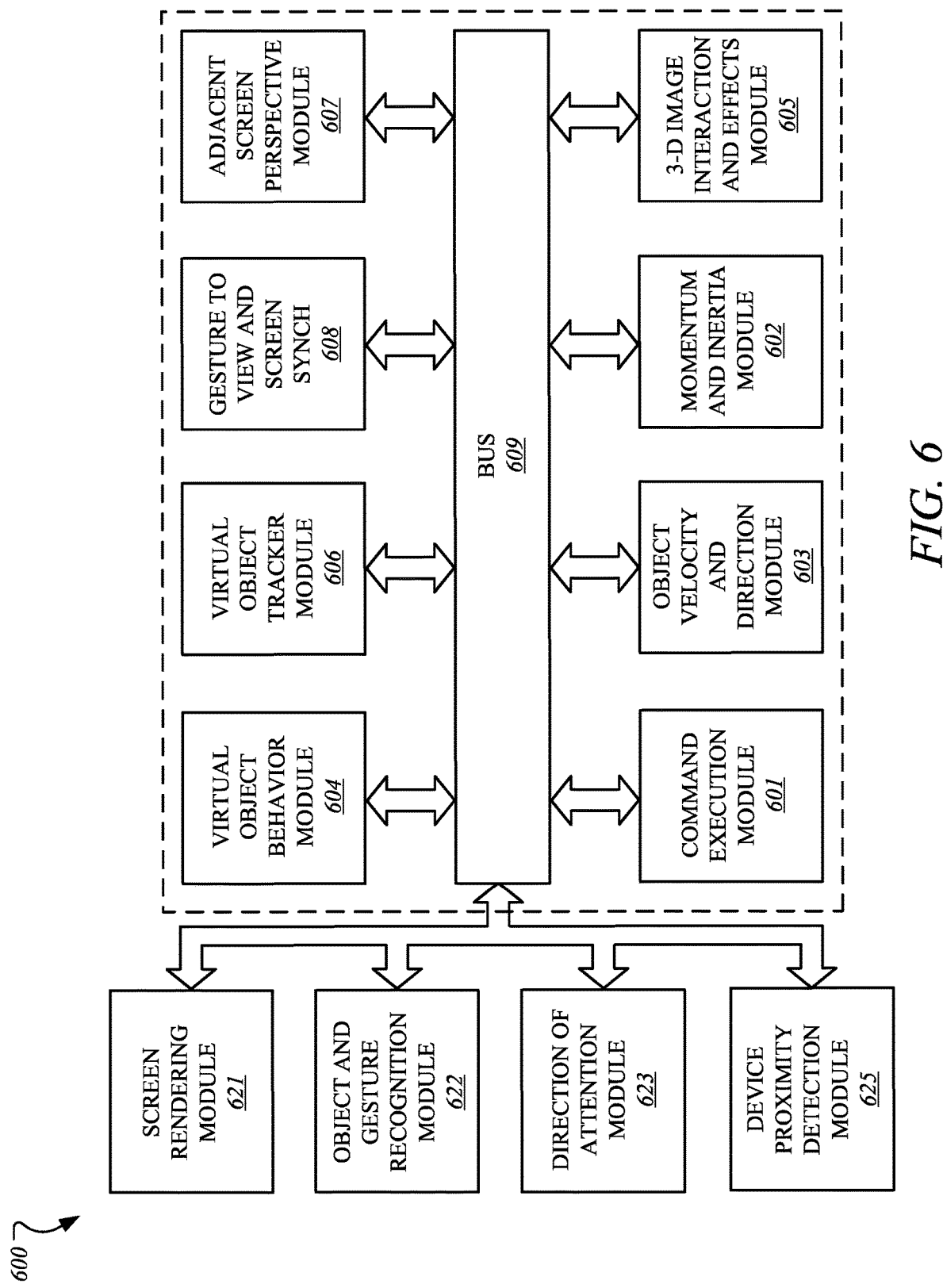
FIG. 6 illustrates an embodiment of a computing environment capable of supporting and implementing one or more embodiments according to one embodiment.

FIG. 6 illustrates an embodiment of a computing environment 600 capable of supporting the operations discussed above. The modules and systems can be implemented in a variety of different hardware architectures and form factors including that shown in FIG. 5.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition Module 622 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without the benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition Module 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three-dimensional space in a vicinity of a display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition Module 622. Various views of an application on one or more screens can be associated with alternative gesture libraries or a set of gesture templates for a given view. As an example, in FIG. 1A, a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual objects across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition Module 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays. As illustrated, various components, such as components 601, 602, 603, 604, 605, 606, 607, and 608 are connected via an interconnect or a bus, such as bus 609.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes an apparatus to facilitate protection and recovery of identities in surveillance camera environments, the apparatus comprising: detection and reception logic to receive a video stream of a scene as captured by a camera, wherein the scene includes persons; recognition and application logic to recognize an abnormal activity and one or more persons associated with the abnormal activity in a video frame of the video stream; and identity recovery logic to recover one or more identities of the one or more persons in response to the abnormal activity, wherein the one or more identities are recovered from masked data and encrypted residuals associated with the one or more persons.

Example 2 includes the subject matter of Example 1, wherein the masked data is based on one or more human pose estimations associated with the one or more persons to protect the one or more identities of the one or more persons by masking body parts of the one or more persons, wherein the masked data and the one or more human pose estimations are compressed.

Example 3 includes the subject matter of Examples 1-2, wherein the masked body parts represent at least one of primary identity sources and secondary identity sources, wherein the primary identity sources include one or more faces of the one or more persons, wherein the secondary identity sources include one or more body parts associated with or wearing one or more identifiable objects, wherein the one or more identifiable objects include one or more of identification (ID) cards, jewelry, watches, shoes, wristbands, clothes, and hats.

Example 4 includes the subject matter of Examples 1-3, further comprising decode and decompression logic to decompress the compressed masked data and the compressed one or more human pose estimations to generate a masked video frame in response to the recognition of the abnormal activity.

Example 5 includes the subject matter of Examples 1-4, further comprising residual decryption logic to decrypt the encrypted residuals associated with the one or more persons and objects from the scene, wherein the encrypted residuals are stored at one or more databases, wherein the encrypted residuals are decrypted to reconstruct residuals to assist in recovery of the one or more identities of the one or more persons.

Example 6 includes the subject matter of Examples 1-5, wherein the camera comprises a closed-captioned television (CCTV) camera or a surveillance camera associated with or embedded in a smart device including an Internet of Things (IoT) device, a smart wearable device, and a mobile device, wherein the smart device serves as an edge server.

Example 7 includes the subject matter of Examples 1-6, wherein the apparatus comprises one or more processors including a graphics processor co-located with an application processor on a common semiconductor package.

Some embodiments pertain to Example 8 that includes a method for facilitating protection and recovery of identities in surveillance camera environments, the method comprising: receiving, by a computing device, a video stream of a scene as captured by a camera, wherein the scene includes persons; recognizing an abnormal activity and one or more persons associated with the abnormal activity in a video frame of the video stream; and recovering one or more identities of the one or more persons in response to the abnormal activity, wherein the one or more identities are recovered from masked data and encrypted residuals associated with the one or more persons.

Example 9 includes the subject matter of Example 8, wherein the masked data is based on one or more human pose estimations associated with the one or more persons to protect the one or more identities of the one or more persons by masking body parts of the one or more persons, wherein the masked data and the one or more human pose estimations are compressed.

Example 10 includes the subject matter of Examples 8-9, wherein the masked body parts represent at least one of primary identity sources and secondary identity sources, wherein the primary identity sources include one or more faces of the one or more persons, wherein the secondary identity sources include one or more body parts associated with or wearing one or more identifiable objects, wherein the one or more identifiable objects include one or more of identification (ID) cards, jewelry, watches, shoes, wristbands, clothes, and hats.

Example 11 includes the subject matter of Examples 8-10, further comprising decompressing the compressed masked data and the compressed one or more human pose estimations to generate a masked video frame in response to the recognition of the abnormal activity.

Example 12 includes the subject matter of Examples 8-11, further comprising decrypting the encrypted residuals associated with the one or more persons and objects from the scene, wherein the encrypted residuals are stored at one or more databases, wherein the encrypted residuals are decrypted to reconstruct residuals to assist in recovery of the one or more identities of the one or more persons.

Example 13 includes the subject matter of Examples 8-12, wherein the camera comprises a closed-captioned television (CCTV) camera or a surveillance camera associated with or embedded in a smart device including an Internet of Things (IoT) device, a smart wearable device, and a mobile device, wherein the smart device serves as an edge server.

Example 14 includes the subject matter of Examples 8-13, wherein the computing device comprises one or more processors including a graphics processor co-located with an application processor on a common semiconductor package.

Some embodiments pertain to Example 15 that includes a data processing system having a processing device coupled to a memory device, the processing device to: receive a video stream of a scene as captured by a camera, wherein the scene includes persons; recognize and application logic to recognize an abnormal activity and one or more persons associated with the abnormal activity in a video frame of the video stream; and recover one or more identities of the one or more persons in response to the abnormal activity, wherein the one or more identities are recovered from masked data and encrypted residuals associated with the one or more persons.

Example 16 includes the subject matter of Example 15, wherein the masked data is based on one or more human pose estimations associated with the one or more persons to protect the one or more identities of the one or more persons by masking body parts of the one or more persons, wherein the masked data and the one or more human pose estimations are compressed.

Example 17 includes the subject matter of Examples 15-16, wherein the masked body parts represent at least one of primary identity sources and secondary identity sources, wherein the primary identity sources include one or more faces of the one or more persons, wherein the secondary identity sources include one or more body parts associated with or wearing one or more identifiable objects, wherein the one or more identifiable objects include one or more of identification (ID) cards, jewelry, watches, shoes, wristbands, clothes, and hats.

Example 18 includes the subject matter of Examples 15-17, wherein the processing device is further to decompress the compressed masked data and the compressed one or more human pose estimations to generate a masked video frame in response to the recognition of the abnormal activity.

Example 19 includes the subject matter of Examples 15-18, wherein the processing device is further to decrypt the encrypted residuals associated with the one or more persons and objects from the scene, wherein the encrypted residuals are stored at one or more databases, wherein the encrypted residuals are decrypted to reconstruct residuals to assist in recovery of the one or more identities of the one or more persons.

Example 20 includes the subject matter of Examples 15-19, wherein the camera comprises a closed-captioned television (CCTV) camera or a surveillance camera associated with or embedded in a smart device including an Internet of Things (IoT) device, a smart wearable device, and a mobile device, wherein the smart device serves as an edge server.

Example 21 includes the subject matter of Examples 15-20, wherein the processing devices a graphics processor co-located with an application processor on a common semiconductor package.

Some embodiments pertain to Example 22 that includes an apparatus to facilitate protection and recovery of identities in surveillance camera environments, the apparatus comprising: means for receiving a video stream of a scene as captured by a camera, wherein the scene includes persons; means for recognizing an abnormal activity and one or more persons associated with the abnormal activity in a video frame of the video stream; and means for recovering one or more identities of the one or more persons in response to the abnormal activity, wherein the one or more identities are recovered from masked data and encrypted residuals associated with the one or more persons.

Example 23 includes the subject matter of Example 22, wherein the masked data is based on one or more human pose estimations associated with the one or more persons to protect the one or more identities of the one or more persons by masking body parts of the one or more persons, wherein the masked data and the one or more human pose estimations are compressed.

Example 24 includes the subject matter of Examples 22-23, wherein the masked body parts represent at least one of primary identity sources and secondary identity sources, wherein the primary identity sources include one or more faces of the one or more persons, wherein the secondary identity sources include one or more body parts associated with or wearing one or more identifiable objects, wherein the one or more identifiable objects include one or more of identification (ID) cards, jewelry, watches, shoes, wristbands, clothes, and hats.

Example 25 includes the subject matter of Examples 22-24, further comprising means for decompressing the compressed masked data and the compressed one or more human pose estimations to generate a masked video frame in response to the recognition of the abnormal activity.

Example 26 includes the subject matter of Examples 22-25, further comprising means for decrypting the encrypted residuals associated with the one or more persons and objects from the scene, wherein the encrypted residuals are stored at one or more databases, wherein the encrypted residuals are decrypted to reconstruct residuals to assist in recovery of the one or more identities of the one or more persons.

Example 27 includes the subject matter of Examples 22-26, wherein the camera comprises a closed-captioned television (CCTV) camera or a surveillance camera associated with or embedded in a smart device including an Internet of Things (IoT) device, a smart wearable device, and a mobile device, wherein the smart device serves as an edge server.

Example 28 includes the subject matter of Examples 22-26, wherein the computing device comprises one or more processors including a graphics processor co-located with an application processor on a common semiconductor package.

Example 29 includes at least one non-transitory or tangible machine-readable medium comprising a plurality of instructions, when executed on a computing device, to implement or perform a method as claimed in any of claims or examples 8-14.

Example 30 includes at least one machine-readable medium comprising a plurality of instructions, when executed on a computing device, to implement or perform a method as claimed in any of claims or examples 8-14.

Example 31 includes a system comprising a mechanism to implement or perform a method as claimed in any of claims or examples 8-14.

Example 32 includes an apparatus comprising means for performing a method as claimed in any of claims or examples 8-14.

Example 33 includes a computing device arranged to implement or perform a method as claimed in any of claims or examples 8-14.

Example 34 includes a communications device arranged to implement or perform a method as claimed in any of claims or examples 8-14.

Example 35 includes at least one machine-readable medium comprising a plurality of instructions, when executed on a computing device, to implement or perform a method or realize an apparatus as claimed in any preceding claims.

Example 36 includes at least one non-transitory or tangible machine-readable medium comprising a plurality of instructions, when executed on a computing device, to implement or perform a method or realize an apparatus as claimed in any preceding claims.

Example 37 includes a system comprising a mechanism to implement or perform a method or realize an apparatus as claimed in any preceding claims.

Example 38 includes an apparatus comprising means to perform a method as claimed in any preceding claims.

Example 39 includes a computing device arranged to implement or perform a method or realize an apparatus as claimed in any preceding claims.

Example 40 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   one or more processors to:
   receive a video stream of a scene as captured by a camera, wherein the scene includes persons;
   recognize an activity that is not in accordance with one or more predefined activities, wherein the activity refers to an abnormal activity, and further recognizing one or more persons associated with the abnormal activity in a video frame of the video stream; and
   recover one or more identities of the one or more persons in response to the abnormal activity, wherein the one or more identities are recovered from masked data and residuals associated with the one or more persons, wherein the one or more identities of the one or more persons are protected by selectively masking body parts of the one or more persons, wherein the residuals refer to one or more portions of the scene that remain unmasked and are subsequently encrypted, wherein the masked body parts represent at least one of primary identity sources and secondary identity sources, wherein the primary identity sources include one or more faces of the one or more persons, wherein the secondary identity sources include one or more body parts associated with or wearing one or more identifiable objects, wherein the masked data is based on one or more human pose estimations associated with the one or more persons to protect the one or more identities of the one or more persons, wherein the masked data and the one or more human pose estimations are compressed.

2. The apparatus of claim 1, wherein the one or more identifiable objects include one or more of identification (ID) cards, jewelry, watches, shoes, wristbands, clothes, and hats.

3. The apparatus of claim 1, wherein the one or more processors are further to decompress the compressed masked data and the compressed one or more human pose estimations to generate a masked video frame in response to the recognition of the abnormal activity.

4. The apparatus of claim 1, wherein the one or more processors are further to decrypt the encrypted residuals associated with the one or more persons and objects from the scene, wherein the encrypted residuals are stored at one or more databases, wherein the encrypted residuals are decrypted to reconstruct residuals to assist in recovery of the one or more identities of the one or more persons.

5. The apparatus of claim 1, wherein the camera comprises a closed-captioned television (CCTV) camera or a surveillance camera associated with or embedded in a smart device including an Internet of Things (IoT) device, a smart wearable device, and a mobile device, wherein the smart device serves as an edge server.

6. The apparatus of claim 1, wherein the one or more processors comprise a graphics processor co-located with an application processor on a common semiconductor package.

7. A method comprising:
   receiving, by a computing device, a video stream of a scene as captured by a camera, wherein the scene includes persons;
   recognizing an activity that is not in accordance with one or more predefined activities, wherein the activity refers to an abnormal activity, and further recognizing one or more persons associated with the abnormal activity in a video frame of the video stream; and
   recovering one or more identities of the one or more persons in response to the abnormal activity, wherein the one or more identities are recovered from masked data and residuals associated with the one or more persons, wherein the one or more identities of the one or more persons are protected by selectively masking body parts of the one or more persons, wherein the residuals refer to one or more portions of the scene that remain unmasked and are subsequently encrypted, wherein the masked body parts represent at least one of primary identity sources and secondary identity sources, wherein the primary identity sources include one or more faces of the one or more persons, wherein the secondary identity sources include one or more body parts associated with or wearing one or more identifiable objects, wherein the masked data is based on one or more human pose estimations associated with the one or more persons to protect the one or more identities of the one or more persons, wherein the masked data and the one or more human pose estimations are compressed.

8. The method of claim 7, wherein the one or more identifiable objects include one or more of identification (ID) cards, jewelry, watches, shoes, wristbands, clothes, and hats.

9. The method of claim 7, further comprising decompressing the compressed masked data and the compressed one or more human pose estimations to generate a masked video frame in response to the recognition of the abnormal activity.

10. The method of claim 7, further comprising decrypting the encrypted residuals associated with the one or more persons and objects from the scene, wherein the encrypted residuals are stored at one or more databases, wherein the encrypted residuals are decrypted to reconstruct residuals to assist in recovery of the one or more identities of the one or more persons.

11. The method of claim 7, wherein the camera comprises a closed-captioned television (CCTV) camera or a surveillance camera associated with or embedded in a smart device including an Internet of Things (IoT) device, a smart wearable device, and a mobile device, wherein the smart device serves as an edge server.

12. The method of claim 7, wherein the computing device comprises one or more processors including a graphics processor co-located with an application processor on a common semiconductor package.

13. At least one non-transitory machine-readable medium comprising instructions which, when executed by a computing device, cause the computing device to perform operations comprising:

receiving a video stream of a scene as captured by a camera, wherein the scene includes persons;

recognizing an activity that is not in accordance with one or more predefined activities, wherein the activity refers to an abnormal activity, and further recognizing one or more persons associated with the abnormal activity in a video frame of the video stream; and recovering one or more identities of the one or more persons in response to the abnormal activity, wherein the one or more identities are recovered from masked data and residuals associated with the one or more persons, wherein the one or more identities of the one or more persons are protected by selectively masking body parts of the one or more persons, wherein the residuals refer to one or more portions of the scene that remain unmasked and are subsequently encrypted, wherein the masked body parts represent at least one of primary identity sources and secondary identity sources, wherein the primary identity sources include one or more faces of the one or more persons, wherein the secondary identity sources include one or more body parts associated with or wearing one or more identifiable objects, wherein the masked data is based on one or more human pose estimations associated with the one or more persons to protect the one or more identities of the one or more persons, wherein the masked data and the one or more human pose estimations are compressed.

14. The non-transitory machine-readable medium of claim 13, wherein the one or more identifiable objects include one or more of identification (ID) cards, jewelry, watches, shoes, wristbands, clothes, and hats.

15. The non-transitory machine-readable medium of claim 13, further comprising decompressing the compressed masked data and the compressed one or more human pose estimations to generate a masked video frame in response to the recognition of the abnormal activity.

16. The non-transitory machine-readable medium of claim 13, further comprising decrypting the encrypted residuals associated with the one or more persons and objects from the scene, wherein the encrypted residuals are stored at one or more databases, wherein the encrypted residuals are decrypted to reconstruct residuals to assist in recovery of the one or more identities of the one or more persons.

17. The non-transitory machine-readable medium of claim 13, wherein the camera comprises a closed-captioned television (CCTV) camera or a surveillance camera associated with or embedded in a smart device including an Internet of Things (IoT) device, a smart wearable device, and a mobile device, wherein the smart device serves as an edge server, wherein the computing device comprises one or more processors including a graphics processor co-located with an application processor on a common semiconductor package.

* * * * *